(12) United States Patent
Jain et al.

(10) Patent No.: US 10,719,109 B2
(45) Date of Patent: Jul. 21, 2020

(54) NOISE MITIGATION APPARATUS AND METHOD WITH POSITIVELY AND NEGATIVELY COUPLED INDUCTORS

(71) Applicant: Intel Corporation, Santa Clara, CA (US)

(72) Inventors: Amit K. Jain, Portland, OR (US); Chin Lee Kuan, Bayan Lepas (MY); Sameer Shekhar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 15/627,159

(22) Filed: Jun. 19, 2017

(65) Prior Publication Data
US 2018/0364775 A1 Dec. 20, 2018

(51) Int. Cl.
*G06F 1/26* (2006.01)
(52) U.S. Cl.
CPC ................... *G06F 1/26* (2013.01)
(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| 7,596,006 B1* | 9/2009 | Granat ................. H02M 1/126 323/224 |
| 2006/0092675 A1 | 5/2006 | Kajita |
| 2008/0061748 A1 | 3/2008 | Wang et al. |
| 2008/0204126 A1 | 8/2008 | Wang et al. |
| 2010/0280676 A1* | 11/2010 | Pabon .................... G06F 1/266 700/295 |
| 2015/0318834 A1 | 11/2015 | Wu et al. |
| 2016/0181812 A1 | 6/2016 | Jain et al. |

OTHER PUBLICATIONS

International Search Report & Written Opinion dated Nov. 15, 2018 for PCT Patent Application No. PCT/US2018/033338.
International Preliminary Report on Patentability notified Jan. 2, 2020 for PCT Patent Application No. PCT/US2018/033338.

* cited by examiner

*Primary Examiner* — Zahid Choudhury
(74) *Attorney, Agent, or Firm* — Green, Howard, & Mughal LLP

(57) ABSTRACT

Described is an apparatus which comprises: a power supply node; a plurality of inductors inductively coupled with one another, wherein at least one inductor of the plurality is electrically coupled to the power supply node; a plurality of loads; and a plurality of capacitors coupled to the plurality of inductors, respectively, and also coupled to the plurality of loads, respectively.

20 Claims, 8 Drawing Sheets

NOISE MITIGATION APPARATUS AND METHOD WITH POSITIVELY AND NEGATIVELY COUPLED INDUCTORS

BACKGROUND

Common power supply may be provided to multiple loads (e.g., processors, logic blocks, etc.). These loads may be noise-sensitive. These loads may also be in close proximity with reference to one another. Close proximity of these multiple noise-sensitive loads due to shrinking form factors and increased feature integration may require sharing of the common power supply. Such close proximity heightens the challenge of power supply noise mitigation due to cross-noise between circuits of the loads. One way to mitigate power supply noise is to use isolation filters. However, besides adding design cost, isolation filters to support tighter jitter and faster clock rates are becoming infeasible due to area scarcity.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figures 1A, 1B:
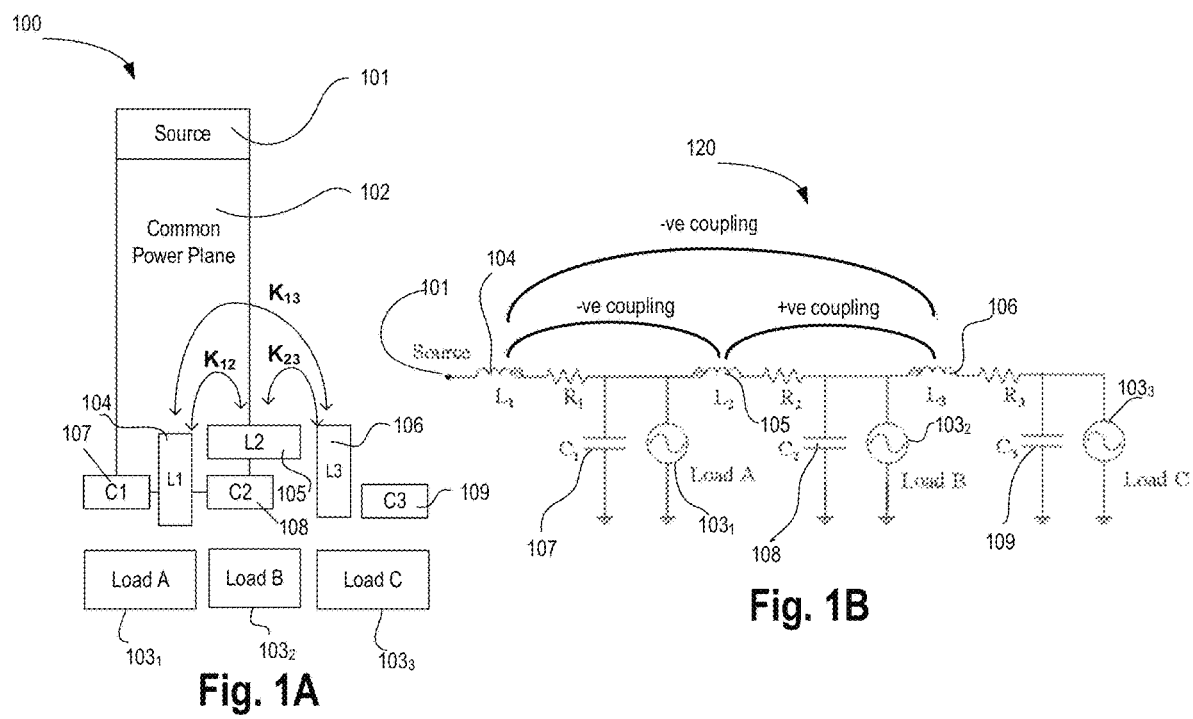
FIG. 1A illustrates a layout of a cascaded filter with positively and/or negatively coupled inductors, according to some embodiments of the disclosure.
FIG. 1B illustrates a schematic of the cascaded filter with positively and/or negatively coupled inductors, according to some embodiments of the disclosure.

Multiple loads can be merged on a single power supply rail to achieve small form factor and low platform bill-of-materials (BOM) cost, increasing the total voltage noise seen by individual circuits due to activity at the load itself (also referred to as self-noise) and noise coupled from one load to another (also referred to as cross-noise). On the other hand, both analog and digital circuits are requiring lower power supply noise due to tighter jitter budgets to support higher speeds and clock rates. Conventionally, LC (inductor-capacitor) noise isolation filters are used to mitigate cross-noise with penalty of area and cost. Furthermore, spatial distribution of loads on a chip in close proximity restricts how passive filters can be implemented.

Various embodiments reduce self-noise and cross-noise for spatially close loads via filter topologies with negative and/or positively coupled inductors. Some embodiments address noise mitigation without the need to increase inductance and instead leverage filter topology and direct noise cancellation via positive and negative coupling of inductors. In some embodiments, the loads are spatially distributed loads. In some embodiments, voltage noise is cancelled via mutual coupling so that noise mitigation relies on the ratio of self and mutual inductances and the coupling polarities instead of the absolute inductance values or the LC filter corner frequency.

There are many technical effects of various embodiments. For example, the filter of various embodiments enables multiple noise sensitive circuits in close proximity where independent isolation filters are infeasible due to limited area. The filter of some embodiments reduce cost and area since cross-noise among multiple loads is mitigated without an increase in filter inductance and capacitance. As such, filter area and cost are reduced enabling solutions for multiple noise sensitive circuits in close proximity. In one example, for an application to a three load case, an overall voltage noise reduction of up to 67% is observed. In some embodiments, all inductors with self and mutual inductance and coupling polarities can be implemented as a single passive structure providing area reduction (e.g., a 3× area reduction). By reducing power delivery noise, lower jitter or power can be realized, which may further improve performance of noise sensitive loads like phase locked loops (PLLs). Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1A illustrates layout 100 of a cascaded filter with positively and/or negatively coupled inductors, according to some embodiments of the disclosure. Layout 100 comprises a power supply source 101 (e.g., a power supply generator, a voltage regulator, DC-DC converter, etc.), power plane 102 to distribute the power supply to filter passive components, inductors 104, 105, and 106; capacitors 107, 108, and 109; and loads $103_{1-3}$. In this example, three loads are shown. However, the techniques for cancelling self-noise and cross-noise are applicable to any number of loads.

Various embodiments illustrate a compact filtering technique with inductors having positive and/or negative coupling for spatially distributed loads coupled to common power plane 102. In some embodiments, supply voltage noise is cancelled via mutual coupling of the inductors so that filtering depends on the ratio of self and mutual inductances and the coupling polarities instead of the absolute inductance values or the LC filter corner frequency. As such, filtering area and cost is reduced over known filtering techniques. FIG. 1A also illustrates coupling coefficients K between inductors. Here, $K_{12}$ is the coupling coefficient between inductor $L_1$ 104 and inductor $L_2$ 105, $K_{23}$ is the coupling coefficient between inductor $L_2$ 105 and inductor $L_3$ 106, and $K_{13}$ is the coupling coefficient between inductor $L_1$ 104 and inductor $L_3$ 106. The sign of the coupling coefficients K depends on the direction of current flow through the inductors. As such, positive and/or negative coupling between inductors are realized to cancel self-noise and/or cross-noise in supply voltage provided to loads $103_{1-3}$.

In some embodiments, loads $103_{1-3}$ are part of a processor. In some embodiments, the processor is coupled to a memory. In some embodiments, the processor includes a supply filter which includes inductors 104, 105, and 106; capacitors 107, 108, and 109.

FIG. 1B illustrates schematic 120 of the cascaded filter with positively and/or negatively coupled inductors, according to some embodiments of the disclosure. Schematic 120 illustrates the physical coupling of inductors 104, 105, and 106, and corresponding capacitors 107, 108, and 109 to corresponding loads $103_1$, $103_2$, and $103_3$, respectively. In some embodiments, the one or more loads (e.g., loads $103_1$, $103_2$, and $103_3$) include one of: processing core, cache, or power management unit.

The routing parasitic resistance from inductor and corresponding loads are shown in schematic 120. For example, $R_1$ is the parasitic resistance coupled in series with inductor $L_1$; $R_2$ is the parasitic resistance coupled in series with inductor $L_2$; and $R_3$ is the parasitic resistance coupled in series with inductor $L_3$. In some embodiments, one or more capacitors (e.g., capacitors 107, 108, and 109) are implemented off-die within a package or board. In some embodiments, one or more capacitors (e.g., capacitors 107, 108, and 109) are implemented as one of: metal capacitors, transistor based capacitors, or a combination of both.

In some embodiments, to cancel voltage supply noise (e.g., self-noise and/or cross-noise), inductors 104 and 105 are negatively coupled as indicated by the dot notation within the inductor symbols which face one another. For example, dot notations for two inductors on the same sides (whether on the left side or the right side) indicate negative coupling. In some embodiments, to cancel voltage supply noise (e.g., self-noise and/or cross-noise), inductors 104 and 106 are negatively coupled as indicated by the dot notation within the inductor symbols which face one another. In some embodiments, to cancel voltage supply noise (e.g., self-noise and/or cross-noise), inductors 105 and 106 are positively coupled as indicated by the dot notation within the inductor symbols which face away from another. For example, dot notations for two inductors on the opposite sides (e.g., one of the left side and the other on the right side) indicate positive coupling.

While various embodiments are illustrated by a three load case, the embodiments can be generalized to arbitrary load configuration. In some embodiments, with the cascaded configuration of FIG. 1B, the overall supply noise reduction is high with the center load $103_2$ which gets the most benefit in terms of noise reduction compared to other loads. For example, the overall noise reduction may be as high as 67%. In some embodiments, a package implementation of the inductors in single structure is extremely advantageous as it avoids multiple adjacent inductors spanning three times the area.

In some embodiments, the position and inductance value of an inductor (and coupling polarity) relative to other inductors depends on the load activity. For example, some loads may draw more current than others and this information may be useful to determine size of the inductor and type of coupling (positive or negative) to cancel self-noise and cross-noise.

The following is an analysis of a filter for two loads, $103_1$ and $103_2$. In this example, the third load $103_3$, its inductor $L_3$ and capacitor $C_3$ are ignored.

The filter topology is decided due to close spatial location of loads and filter implementation feasibility (e.g., inability to realize filter inductors far from the load locations) on common power plane 101. In all description capacitors will be ignored. The cross-noise from Load B to Load A is given by $$v_{AB} = L_{AB} \frac{di_B}{dt} = (L_1 + L_{m,1-2}) \frac{di_B}{dt}$$

where $L_{m,1-2}$ is the mutual inductance between inductors $L_1$ and $L_2$

By introducing negative coupling between inductors $L_1$ and $L_2$ direct noise cancellation is achieved and $L_{AB}=L_1-|L_{m,1-2}|$, and therefore the cross-noise $v_{AB}$ can be minimized by designing the relative values of $L_1$, $L_{m,1-2}$ and the coupling polarity. The same argument holds for minimizing or reducing cross-noise $v_{BA}$. Since cross-noise is reduced, higher inductance values may not be used so inductor and capacitor sizes can be reduced.

The self-noise for the three load case of FIG. 1B is determined by:

$L_{AA}=L_1$;

$L_{BB}=L_1+L_2+L_{m,1-2}+L_{m,1-2}$; and $L_{CC}=L_1+L_2+L_3+L_{m,1-3}+L_{m,2-3}$ In this example, self-noise for Load 2 $103_2$ is reduced by introducing negative coupling, e.g., $L_{m,1-2}<0$. Similarly, self-noise for Load 3 $103_3$ is reduced with $L_{m,1-3}<0$.

Cross-noise is determined by:

$L_{AB}=L_{BA}=(L_1+L_{m,1-2})$;

$L_{CB}=L_{BC}=(L_1+L_2+L_{m,1-2}+L_{m,1-2}+L_{m,2-3})$; and $L_{CA}=L_{AC}=(L_1+L_{m,1-2}+L_{m,1-3}$ Here, $L_{AB}$ and $L_{BC}$ are reduced as in the two load case by choosing negative coupling (e.g., $L_{m,1-2}<0$). $L_{BC}$ can be reduced further with $L_{m,2-3}<0$ if $L_{m,1-3}>0$ is chosen, and this penalizes the self-noise for Load C $103_3$.

Figure 2:
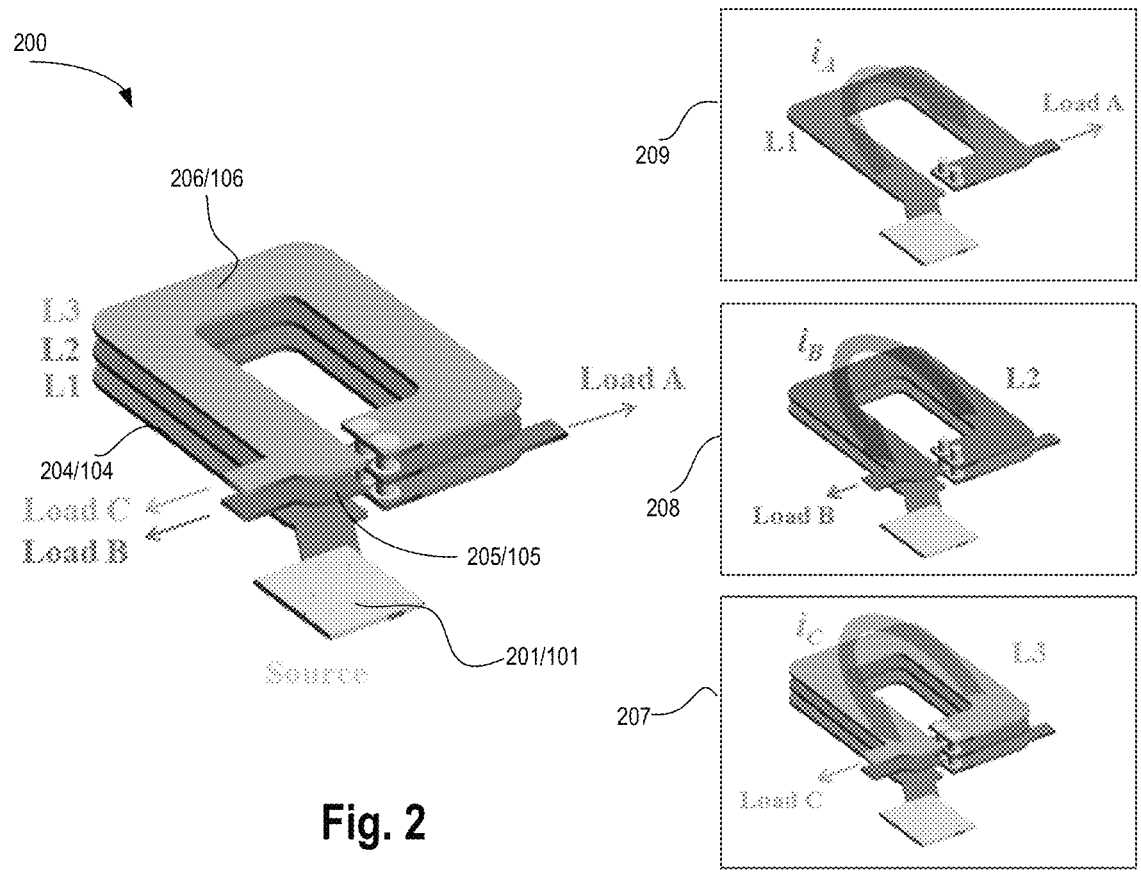
FIG. 2 illustrates a three dimensional (3D) view of a layout of the positively and/or negatively coupled inductors, according to some embodiments of the disclosure.

FIG. 2 illustrates a 3D view 200 of a layout of the positively and/or negatively coupled inductors, according to some embodiments of the disclosure. It is pointed out that those elements of FIG. 2 having the same reference numbers (or names) as the elements of any other figure can operate or function in any manner similar to that described, but are not limited to such.

The 3D view 200 illustrates inductors $L_1$, $L_2$, and $L_3$ that are vertically stacked to reduce area, according to some embodiments of the disclosure. In some embodiments, inductor $L_1$ 204/104 has two ports, one of which is coupled to source 201/101 pad and another is to couple to load A. In some embodiments, inductor $L_2$ 205/105 has two ports, one of which is coupled to inductor $L_1$ through vias while another port is to couple to load B. In some embodiments, inductor $L_3$ 206/106 has two ports, one of which is coupled to inductor $L_2$ through vias while another port is to couple to load C. The mutual inductance coupling is determined by the current direction through the inductors. Blocks 207, 208, and 209 illustrate the current directions which indicate that inductors 204/104 and 205/105 are negatively coupled, inductors 204/104 and 206/106 are negatively coupled, and inductors 205/105 and 206/106 are positively coupled.

In some embodiments, one or more inductors (e.g., inductors $L_1$, $L_2$, and $L_3$ or at least two of them) are implemented on die as one of: a stack of inductor rings or coils on a magnetic core. In some embodiments, the one or more inductors are implemented off-die within a package or board. In some embodiments, the one or more inductors are inductively coupled positively and/or negatively with one another by at least 50%.

Figure 3:
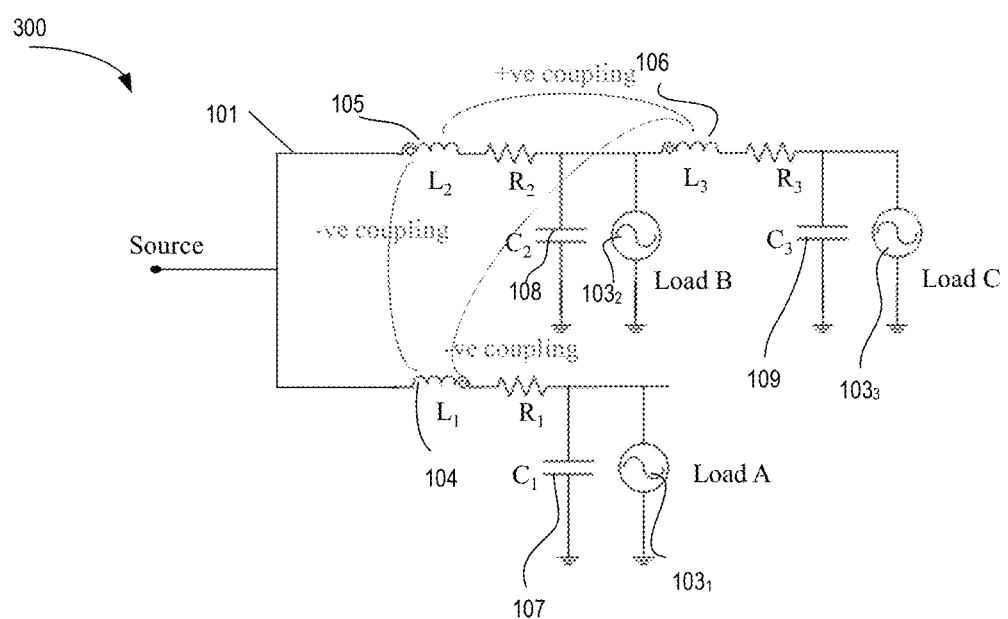
FIG. 3 illustrates a schematic of a filter with positively and/or negatively coupled inductors, according to some embodiments of the disclosure.

FIG. 3 illustrates a schematic of a filter 300 with positively and/or negatively coupled inductors, according to some embodiments of the disclosure. It is pointed out that those elements of FIG. 3 having the same reference numbers (or names) as the elements of any other figure can operate or function in any manner similar to that described, but are not limited to such.

Compared to the filter of FIG. 1B, here both inductors $L_1$ and $L_2$ are coupled to source 101, in accordance with some embodiments. In some embodiments, to cancel voltage supply noise (e.g., self-noise and/or cross-noise), inductors 104 and 105 are negatively coupled as indicated by the dot notation within the inductor symbols. In some embodiments, to cancel voltage supply noise (e.g., self-noise and/or cross-noise), inductors 104 and 106 are negatively coupled as indicated by the dot notation within the inductor symbols. In some embodiments, to cancel voltage supply noise (e.g., self-noise and/or cross-noise), inductors 105 and 106 are positively coupled as indicated by the dot notation within the inductor symbols. FIG. 3 illustrates that various configurations are possible for positioning inductors and loads with reference to source 101.

Figure 4:
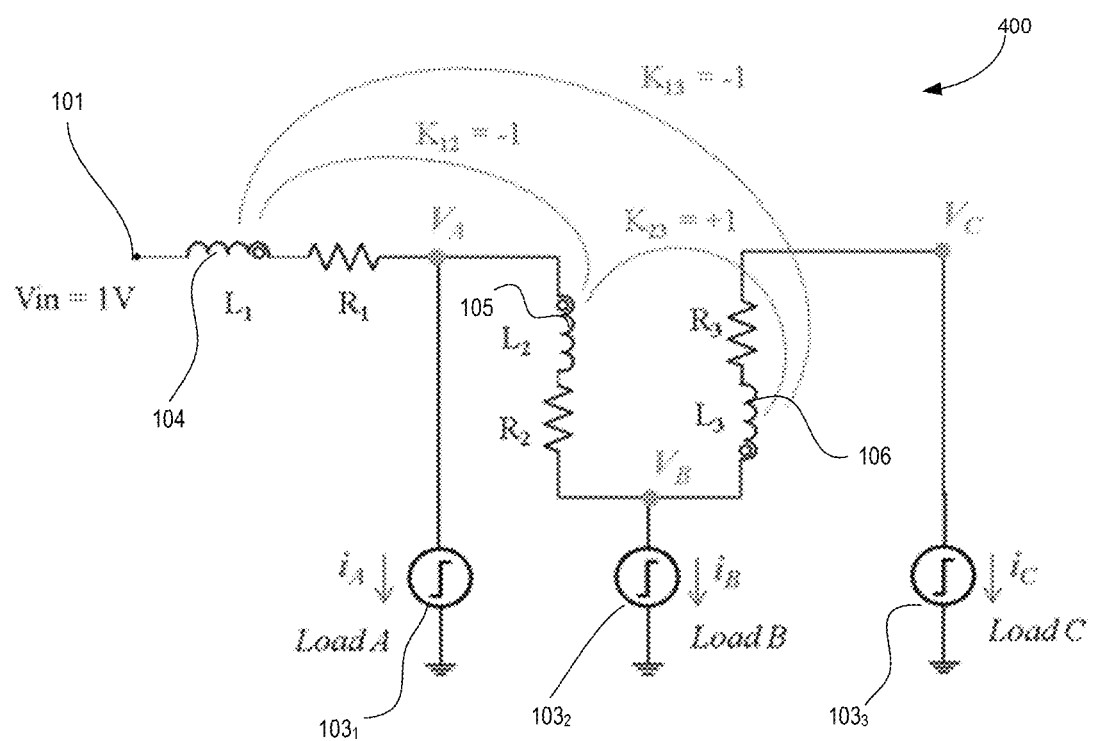
FIG. 4 illustrates a transient simulation model of the cascaded filter, according to some embodiments of the disclosure.

FIG. 4 illustrates a transient simulation model 400 of the cascaded filter, according to some embodiments of the disclosure. It is pointed out that those elements of FIG. 4 having the same reference numbers (or names) as the elements of any other figure can operate or function in any manner similar to that described, but are not limited to such.

Here, inductor $L_1$ represents the common current path from input source to all loads. In some embodiments, mutual coupling between inductors $L_1$, $L_2$ and $L_3$ are designed such that inductor $L_1$ is negatively coupled to inductors $L_2$ and $L_3$, and inductor $L_2$ is positively coupled to inductor $L_3$ (here, coupling coefficients $K_{12}=K_{13}=-1$, $K_{23}=+1$ are assumed for illustration simplicity). Load voltages $V_A$, $V_B$ and $V_C$ for all possible combinations of loading scenarios are examined.

Figure 5:
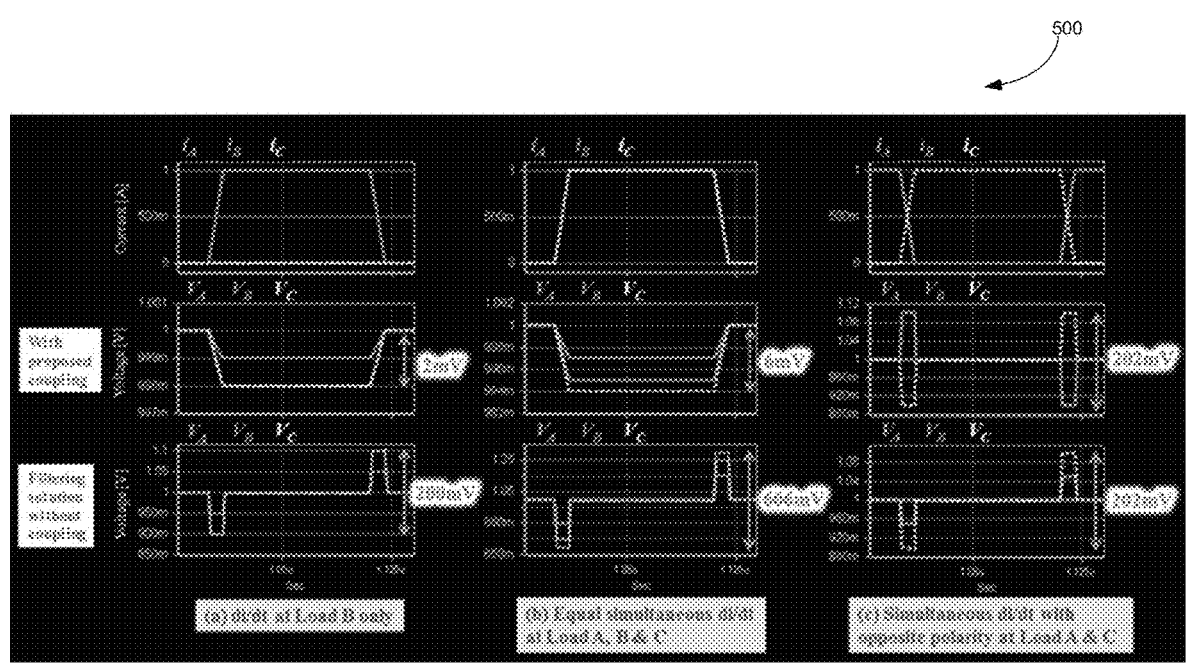
FIG. 5 illustrates plots showing simulation results of the transient simulation model, according to some embodiments of the disclosure.

FIG. 5 illustrates plots 500 showing simulation results of the transient simulation model of FIG. 4, according to some embodiments of the disclosure. It is pointed out that those elements of FIG. 5 having the same reference numbers (or names) as the elements of any other figure can operate or function in any manner similar to that described, but are not limited to such. Plot 500 shows three columns of plots. The left column (a) illustrates di/dt at Load B only, the middle column (b) illustrates equal simultaneous di/dt at Loads A, B and C, and the right column (c) illustrates simultaneous di/dt with opposite polarity at Loads A and C. Plot 500 shows the maximum noise voltage with the coupling inductances of various embodiments reduces voltage noise from ±300 mV to ±100 mV, a 67% reduction.

Column (a) and column (b) show transient droops due to positively correlated loads are largely offset by positively and/or negatively induced voltages, so that a low IR drop remains. With only Load B activity, column (a) shows that the noise at load A reduces from ±50 mV to ±1 mV while that at loads B and C reduces from ±100 mV to ±2 mV. With simultaneous excitation at all three loads, the voltage noise reduces from ±150/250/300 mV at A, B, C to 6 mV. With opposite polarity excitation at A and C column (c) shows that the noise voltages at Load B reduces from ±150 mV to nearly 0, at Load A noise increases to 100 mV but is still less than that in case shown in column (b), at Load C remains the same.

Figure 6:
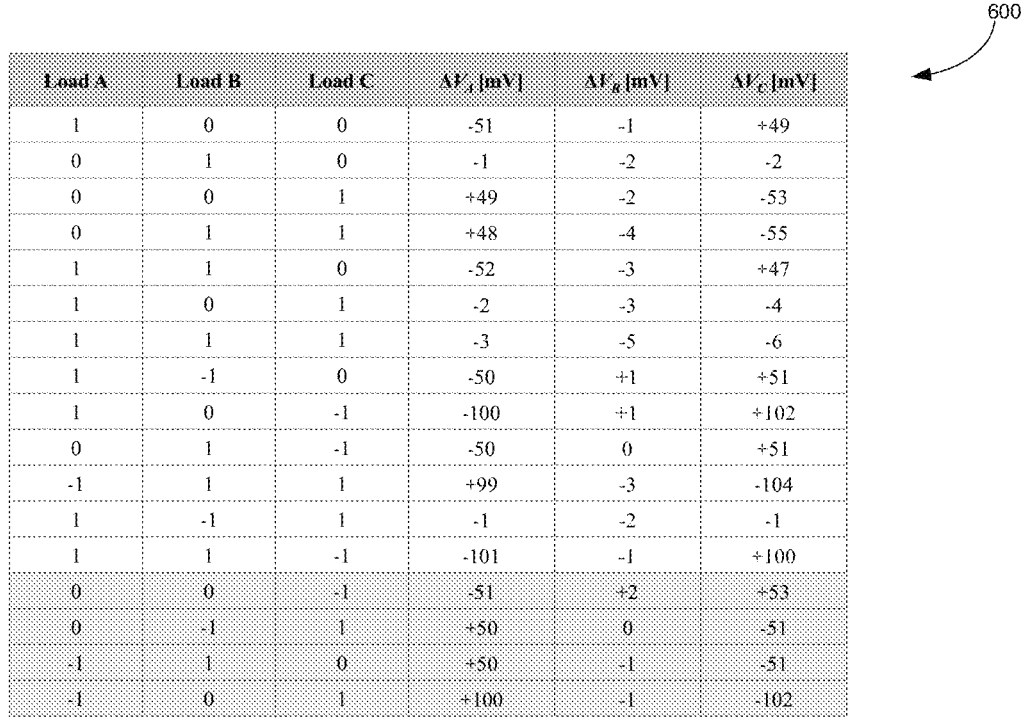
FIG. 6 illustrates a table showing voltage drops for the cascaded filter, according to some embodiments of the disclosure.

FIG. 6 illustrates table 600 showing voltage drops for the cascaded filter, according to some embodiments of the disclosure. Table 600 shows voltage drops with multiple load excitations for $K_{12}=-1$, $K_{23}=+1$, $K_{13}=-1$ (e.g., Excitation=0: inactive load, Excitation=1: load surge, and Excitation=-1: load release). Table 600 shows voltage drops for mutual coupling with multiple load excitations (correlated or uncorrelated loads), in accordance with some embodiments. In this example, Load B is overall the best with least voltage fluctuations over nominal. Load B is the best option for a victim candidate with stringent self-noise and cross-noise requirement. Here, the four gray shaded rows from the bottom are redundant due to simple inversion of polarity or because Load B is not causing additional noise, for example.

Figure 7:
FIG. 7 illustrates a table showing choice of coupling inductances for different loads, according to some embodiments of the disclosure.

FIG. 7 illustrates table 700 showing choice of coupling inductances for different loads, according to some embodiments of the disclosure. The mutual coupling mechanism of various embodiments show overall benefits during individual or simultaneous load activities. Table 700 concludes that worst-case noise with the coupling of various embodiments ($K_{12}=-1$, $K_{23}=+1$, $K_{13}=-1$) is always better than or same as the case without coupling introduced. Load B benefits most for self-noise reduction while Load C observes most coupled noise reduction. All loads A, B and C see benefits during maximum loading scenario when all loads are active. Generally, positive and/or negative mutual coupling inductances for each load can be chosen based on system applications (e.g., load activity, self-noise versus coupling-noise sensitivity) to maximize design benefits.

The following section describes the generalization of the various embodiments. In a generic load configuration, the total noise at each load location is the sum of the self-noise and cross-noise components, which can be expressed as:

$$v_k = \underbrace{L_{kk} \frac{di_k}{dt}}_{v_{k,self}} + \underbrace{\sum_{j \ne k} L_{kj} \frac{di_j}{dt}}_{v_{k,cross}}; k, j = A, B, C, \ldots$$

In some embodiments, the filter topology can be chosen based on spatial distribution of the loads. In some embodiments, the filter topology determines the dependence of the self-noise and cross-noise terms (e.g., $L_{kk}$ and $L_{jk}$) on the individual filter inductances and mutual coupling (e.g., $L_1$, $L_2$ $L_3$ and $L_{m,1-2}$, $L_{m,2-3}$, $L_{m,3-1}$ in the cascaded load case). In some embodiments, the coupling polarities can be chosen followed by self and mutual inductance values to meet noise objectives. Load characteristics may factor into these decisions. In one example, some analog circuits like phase locked loops (PLLs) have higher sensitivity to external noise as compared to self-noise in which case cross-noise terms ($L_{AB}$, $L_{BC}$, $L_{CA}$, ...) can be minimized potentially at the expense of the self-noise terms ($L_{AA}$, $L_{BB}$, $L_{CC}$, ...). In the example of FIG. 2, Load B gets the most benefit, so the most sensitive load can be connected at the center of the filter structure, in accordance with some embodiments.

Figure 8:
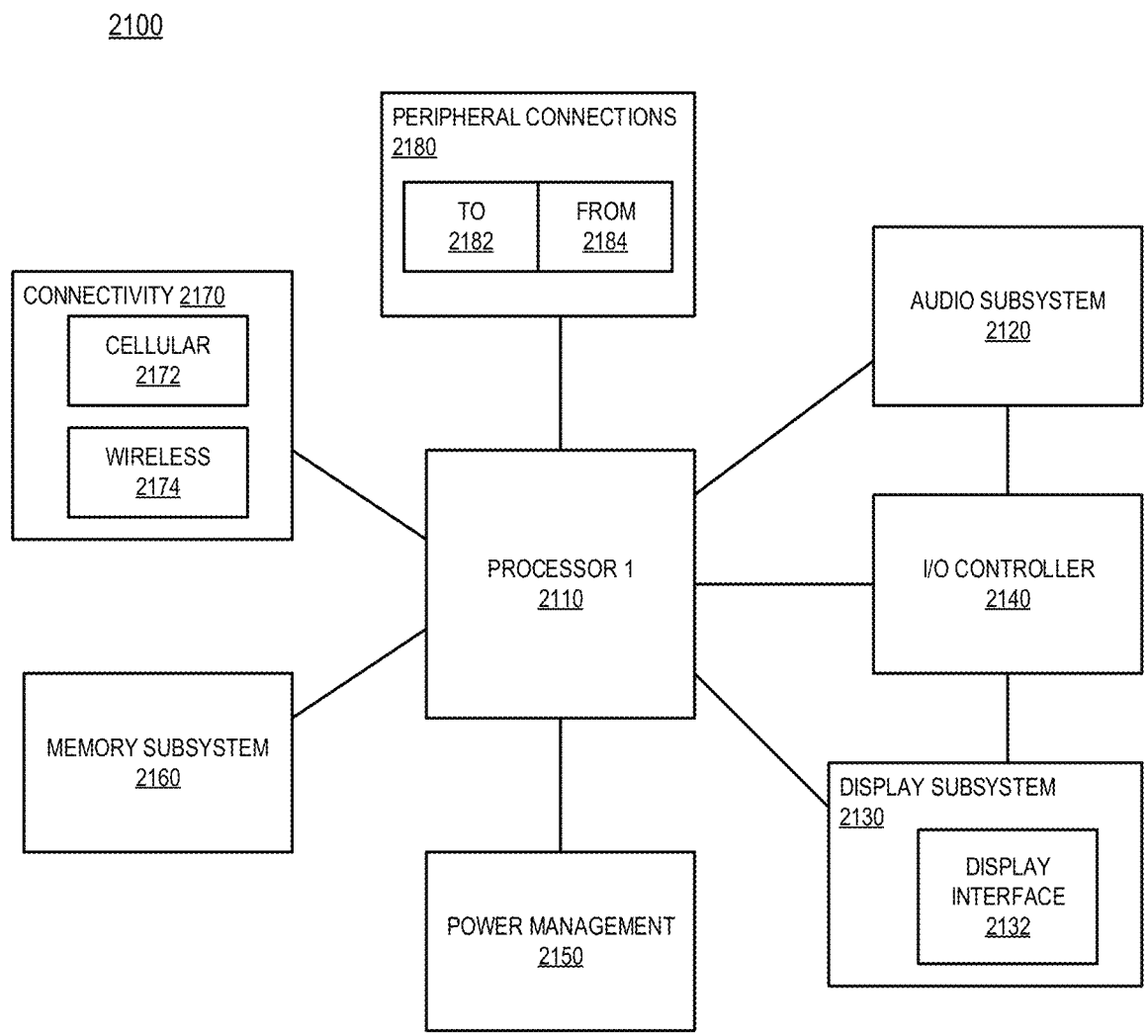
FIG. 8 illustrates a smart device or a computer system or a SoC (System-on-Chip) that receives a power supply using the filter, in accordance with some embodiments.

FIG. 8 illustrates a smart device or a computer system or a SoC (System-on-Chip) that receives a power supply using the filter, in accordance with some embodiments. It is pointed out that those elements of FIG. 8 having the same reference numbers (or names) as the elements of any other figure can operate or function in any manner similar to that described, but are not limited to such.

FIG. 8 illustrates a block diagram of an embodiment of a mobile device in which flat surface interface connectors could be used. In some embodiments, computing device 2100 represents a mobile computing device, such as a computing tablet, a mobile phone or smart-phone, a wireless-enabled e-reader, or other wireless mobile device. It will be understood that certain components are shown generally, and not all components of such a device are shown in computing device 2100.

In some embodiments, computing device 2100 includes a first processor 2110 which receives power supply using the filter of various embodiments, according to some embodiments discussed. Other blocks of the computing device 2100 may also receive power supply using the filter of various embodiments according to some embodiments. The various embodiments of the present disclosure may also comprise a network interface within 2170 such as a wireless interface so that a system embodiment may be incorporated into a wireless device, for example, cell phone or personal digital assistant.

In one embodiment, processor 2110 (and/or processor 2190) can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 is an apparatus which comprises: a power supply node; a plurality of inductors inductively coupled with one another, wherein at least one inductor of the plurality is electrically coupled to the power supply node; a plurality of loads; and a plurality of capacitors coupled to the plurality of inductors, respectively, and also coupled to the plurality of loads, respectively.

Example 2 includes all features of example 1, wherein the plurality of inductors include at least two inductor that are inductively positively coupled with one another.

Example 3 includes features of any of examples 1 to 2, wherein the plurality of inductors include at least two inductor that are inductively negatively coupled with one another.

Example 4 includes features of any of examples 1 to 3, wherein the plurality of inductors are implemented on die as one of: a stack of inductor rings or coils on a magnetic core.

Example 5 includes features of any of examples 1 to 4, wherein plurality of inductors are implemented off-die within a package or board.

Example 6 includes features of any of examples 1 to 5, wherein the plurality of capacitors are implemented as one of: metal capacitors, transistor based capacitors, or a combination of both.

Example 7 includes features of any of examples 1 to 6, wherein the plurality of capacitors are implemented off-die within a package or board.

Example 8 includes features of any of examples 1 to 7, wherein the plurality of loads include one of: processing core, cache, or power management unit.

Example 9 includes features of any of examples 1 to 8, wherein the plurality of inductors are inductively coupled positively and/or negatively with one another by at least 50%.

Example 10 is an apparatus which comprises: a node to receive power supply; a first inductor coupled to the node; a first capacitor coupled to the first inductor, wherein the first capacitor is to couple to a first load; a second inductor coupled to the first inductor; a second capacitor coupled to the second inductor, wherein the second capacitor is to couple to a second load separate from the first load; a third inductor coupled to the second inductor; and a third capacitor coupled to the third inductor, wherein the third capacitor is to couple to a third load separate from the first and second loads; wherein the first, second, and third inductors are inductively coupled to one another.

Example 11 includes all features of example 10, wherein the first, second, and third inductors are inductively coupled positively or negatively with one another by at least 50%.

Example 12 includes features of any of examples 10 to 11, wherein the first, second, and third loads include one of: processing core, cache, or power management unit.

Example 13 includes features of any of example 10 to 12, wherein the first, second, and third inductors are implemented on die as one of: a stack of inductor rings or coils on a magnetic core.

Example 14 includes features of any of example 10 to 13, wherein the first, second, and third inductors are implemented off-die within a package or board.

Example 15 includes features of any of example 10 to 14, wherein the first, second, and third capacitors are implemented as one of: metal capacitors, transistor based capacitors, or a combination of both.

Example 16 includes features of any of example 10 to 15, wherein the first, second, and third capacitors are implemented off-die within a package or board.

Example 17 is a system which comprises: a power supply generator to provide a power supply; a memory; and a processor coupled to the memory, the processor having a supply filter which comprises: a power supply node to receive the power supply; a plurality of inductors inductively coupled with one another, wherein at least one inductor of the plurality is electrically coupled to the power supply node; a plurality of loads; and a plurality of capacitors coupled to the plurality of inductors, respectively, and also coupled to the plurality of loads, respectively; and a wireless interface to allow the processor to communicate with another device.

Example 18 includes all features of example 17, wherein the system of example 18 is according to any one of examples 2 to 9.

Example 19 is a system which comprises: a power supply generator to provide a power supply; a memory; and a processor coupled to the memory, the processor having a supply filter which an apparatus according to any one of examples 10 to 16; and a wireless interface to allow the processor to communicate with another device.

Example 20 is a method which comprises: inductively coupling a plurality of inductors with one another, wherein at least one inductor of the plurality is electrically coupled to the power supply node; coupling a plurality of capacitors to the plurality of inductors, respectively; and coupling the plurality of capacitors to the plurality of loads, respectively.

Example 21 includes all features of example 20, wherein the plurality of inductors include at least two inductor that are inductively positively coupled with one another.

Example 22 includes features of any of examples 20 to 21, wherein the plurality of inductors include at least two inductor that are inductively negatively coupled with one another.

Example 23 includes features of any of examples 20 to 23, wherein the plurality of inductors are implemented on die as one of: a stack of inductor rings or coils on a magnetic core.

Example 24 includes features of any of examples 20 to 23, wherein plurality of inductors are implemented off-die within a package or board.

Example 25 includes features of any of examples 20 to 24, wherein the plurality of capacitors are implemented as one of: metal capacitors, transistor based capacitors, or a combination of both.

Example 26 includes features of any of examples 20 to 25, wherein the plurality of capacitors are implemented off-die within a package or board.

Example 27 includes features of any of examples 20 to 26, wherein the plurality of loads include one of: processing core, cache, or power management unit.

Example 28 includes features of any of examples 20 to 27, wherein the plurality of inductors are inductively coupled positively and/or negatively with one another by at least 50%.

Example 29 is an apparatus which comprises: means for inductively coupling a plurality of inductors with one another, wherein at least one inductor of the plurality is electrically coupled to the power supply node; means for coupling a plurality of capacitors to the plurality of inductors, respectively; and means for coupling the plurality of capacitors to the plurality of loads, respectively.

Example 30 includes all features of example 29, wherein the apparatus of example 29 is according to any one of example 2 to 9.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a power supply node;
a plurality of inductors inductively coupled with one another, wherein at least one inductor of the plurality of inductors is electrically coupled to the power supply node;
a plurality of loads including a power management circuitry and processor core; and
a plurality of capacitors coupled to the plurality of inductors, respectively, and also coupled to the plurality of loads, respectively such that each capacitor is connected to a corresponding load.

2. The apparatus of claim 1, wherein the plurality of inductors include at least two inductors that are inductively positively coupled with one another.

3. The apparatus of claim 1, wherein the plurality of inductors include at least two inductors that are inductively negatively coupled with one another.

4. The apparatus of claim 1, wherein the plurality of inductors are implemented on die as one of: a stack of inductor rings or coils on a magnetic core.

5. The apparatus of claim 1, wherein plurality of inductors are implemented off-die within a package or board.

6. The apparatus of claim 1, wherein the plurality of capacitors are implemented as one of: metal capacitors, transistor based capacitors, or a combination of both.

7. The apparatus of claim 1, wherein the plurality of capacitors are implemented off-die within a package or board.

8. The apparatus of claim 1, wherein the plurality of loads include cache.

9. The apparatus of claim 1, wherein the plurality of inductors are inductively coupled positively and/or negatively with one another by at least 50%.

10. An apparatus comprising:
a node to receive power supply;
a first inductor coupled to the node;
a first capacitor coupled to the first inductor, wherein the first capacitor is to couple connect to a first load comprising a power management circuitry;
a second inductor coupled to the first inductor;
a second capacitor coupled to the second inductor, wherein the second capacitor is to connect to a second load separate from the first load, wherein the second load comprises a processor core;
a third inductor coupled to the second inductor; and
a third capacitor coupled to the third inductor, wherein the third capacitor is to eeeple connect to a third load separate from the first and second loads, and
wherein the first, second, and third inductors are inductively coupled to one another.

11. The apparatus of claim 10, wherein the first, second, and third inductors are inductively coupled positively or negatively with one another by at least 50%.

12. The apparatus of claim 10, wherein the third load includes cache.

13. The apparatus of claim 10, wherein the first, second, and third inductors are implemented on die as one of: a stack of inductor rings or coils on a magnetic core.

14. The apparatus of claim 10, wherein the first, second, and third inductors are implemented off-die within a package or board.

15. The apparatus of claim 10, wherein the first, second, and third capacitors are implemented as one of: metal capacitors, transistor based capacitors, or a combination of both.

16. The apparatus of claim 10, wherein the first, second, and third capacitors are implemented off-die within a package or board.

17. A system comprising:
a power supply generator to provide a power supply;
a memory; and
a processor coupled to the memory, the processor having a supply filter which comprises:
a power supply node to receive the power supply;
a plurality of inductors inductively coupled with one another, wherein at least one inductor of the plurality of the inductors is electrically coupled to the power supply node;
a plurality of loads including a power management circuitry and processor core; and
a plurality of capacitors coupled to the plurality of inductors, respectively, and also coupled to the plurality of loads, respectively such that each capacitor is connected to a corresponding load; and
a wireless interface to allow the processor to communicate with another device.

18. The system of claim 17, wherein the plurality of inductors include at least two inductor that are inductively positively coupled with one another.

19. The system of claim 17, wherein the plurality of inductors include at least two inductor that are inductively negatively coupled with one another.

20. The system of claim 17, wherein the plurality of inductors are implemented on die as one of: a stack of inductor rings or coils on a magnetic core.

* * * * *